United States Patent [19]

Chisholm

[11] 4,052,826
[45] Oct. 11, 1977

[54] BREAKAWAY COUPLING ASSEMBLY WITH FRACTURE-INITIATING WASHER

[76] Inventor: Douglas B. Chisholm, 1906 Memory Court, Vienna, Va. 22180

[21] Appl. No.: 709,943

[22] Filed: July 29, 1976

Related U.S. Application Data

[60] Continuation-in-part of Ser. No. 669,476, March 23, 1976, Pat. No. 4,007,564, which is a continuation-in-part of Ser. No. 519,670, Nov. 12, 1974, abandoned, and Ser. No. 628,641, Nov. 4, 1975, abandoned, which is a continuation of Ser. No. 539,089, Jan. 7, 1975, which is a continuation of Ser. No. 350,173, April 11, 1973, said Ser. No. 519,670, is a division of said Ser. No. 350,173.

[51] Int. Cl.² .............................................. E04B 1/36
[52] U.S. Cl. ...................................... 52/98; 52/295; 403/2; 403/186
[58] Field of Search ................ 52/98, 99, 294, 295, 52/753 B; 285/1, 2, 3, 4; 403/2, 11, 286, 292, 186, 305; 40/125 H, 125 N

[56] References Cited

U.S. PATENT DOCUMENTS

| 1,372,238 | 3/1921 | Kreiter | 403/305 |
| 1,604,122 | 10/1926 | Hosking | 52/753 B |
| 3,349,531 | 10/1967 | Watson | 52/98 X |
| 3,381,427 | 5/1968 | Watson | 52/98 |
| 3,630,474 | 12/1971 | Minor | 52/98 X |
| 3,637,244 | 1/1972 | Strizki | 52/98 X |

Primary Examiner—Ernest R. Purser
Assistant Examiner—Robert C. Farber
Attorney, Agent, or Firm—Cushman, Darby & Cushman

[57] ABSTRACT

An upright standard assembly for failing when subjected to horizontal impact forces while solidly supporting an upright standard under normal conditions. The assembly includes a generally vertical standard, a base member, a connection member to releasably attach the standard to the base member, at least one fracture initiating slot formed in the coupling body, and a washer having one or more teeth formed therein for receipt by the fracture-initiating slot(s) of the coupling body. The washer is made of harder material than the coupling body, and has a smooth bore extending therethrough so that no positive holding action is provided between it and the connection member extending therethrough. The coupling body also does not have any threads formed on the portion thereof between the longitudinal termination of the slot(s) and the connection member receiving end thereof.

10 Claims, 13 Drawing Figures

BREAKAWAY COUPLING ASSEMBLY WITH FRACTURE-INITIATING WASHER

CROSS-REFERENCE TO RELATED APPLICATIONS

This application is a continuation-in-part of application Ser. No. 669,476, filed Mar. 23, 1976, now U.S. Pat. No. 4,007,564 which in turn is a continuation-in-part of both applications Ser. No. 519,670 filed Nov. 12, 1974 now abandoned and Ser. No. 628,641 filed Nov. 4, 1975, now abandoned which application Ser. No. 519,670 is a divisional of application Ser. No. 350,173 filed Apr. 11, 1973, and which application Ser. No. 628,641 is a continuation of application Ser. No. 539,089 filed Jan. 7, 1975, which in turn is a continuation of application Ser. No. 350,173 filed Apr. 11, 1973.

BACKGROUND AND SUMMARY OF THE INVENTION

Several varieties of breakaway couplings are known for the support of light standards, signs, parking meters, and the like. Some of these couplings or connectors are shown in U.S. Pat. Nos. 3,630,474; 3,572,223; 3,349,531 and 3,521,413, the teachings of which are herewith incorporated by reference thereto. Such breakaway connectors or couplings desirably fail readily when the supported structure is subjected to lateral impact such as may be applied by a colliding automobile. However, the coupling must have substantial tensile and compressive strength. Yet such couplings desirably fail under the impact force in such a manner as to substantially reduce accident severity to motorists who are sufficiently unfortunate to be closely involved with the failure of such a coupling. Many breakaway coupling devices employ a shear or sliding mode of crack propagation; i.e., one surface of the ruptured coupling slides over another surface of the coupling during the impact failure process.

It would be desirable if there was available an improved breakaway coupling for support poles, standards and the like.

It would also be desirable if there was available an improved breakaway support assembly of high tensile and compressive strength but which ruptures when rapidly loaded in a direction normal to its direction of maximum strength.

It would also be desirable to have an improved method for the support of standards which provides structures of adequate strength and which fails readily under impact normal to the longitudinal axis of the standard.

It would further be desirable if there were available an improved support assembly employing at least on generally vertically disposed support which, on being impacted by a body such as an automobile, would readily fail from a horizontally directed impact yet have adequate tensile and compressive strength in the vertical direction.

According to the present invention, a combination is provided comprising a generally vertical standard, a base member, a connection member, and means affixed to either the standard or base member for receiving the connection member and thereby releasably coupling the standard to the base member. The coupling means receives the connection member and fractures radially with respect to a generally vertical axis of connection, in response to an impact force being applied to the standard in a generally horizontal direction. The coupling means comprises a coupling body that is generally symmetrically disposed about any plane containing the axis of connection, and has one end thereof having an opening formed therein for receipt of the connection member. A plurality of V-shaped grooves, which define regions of minimum strength, surround the connection member and extend from the connection member receiving end of the body parallel to the axis of connection, and extend at least a distance corresponding to the length of the connection member received by the body, so that upon an impact force in a generally horizontal direction acting upon the standard, the coupling will radially fracture to thereby release the connection member and provide detachment of the standard from the base member. The grooves in the coupling body may extend the entire length of the body, and the body may be formed of aluminum, and either case or extrude.

Fracture initiating means also may be provided associated with the body member, either in the form of sharpened bottom portions at the end of the coupling body defining the connection member receiving opening, or in the form of slots extending along the length of the grooves from the connection member receiving opening.

A fracture-initiating washer may also be provided in combination with the connection member, standard, and coupling means, the fracture-initiating washer being formed of relatively hard material having one or more teeth formed thereon for cooperation with corresponding slots formed in the coupling means and extending along the length of the grooves therein from the connection member receiving opening thereof. Preferably the fracture-initiating washer is formed of steel, or other material harder than the material forming the coupling means, and the connection member receiving bore extending through the washer is not threaded. Similarly, the top portion of the coupling means extending below the bottom termination of the fracture-initiating slots therein being threaded.

It is the primary object of the present invention to provide an assembly for mounting an upright standard including an inexpensive coupling body that is strong in tension and compression, but will radially fracture easily when the standard is subjected to a horizontal force. This and other objects of the present invention will become apparent from an inspection of the detailed description of the invention, and from the appended claims.

DETAILED DESCRIPTION OF THE DRAWINGS

Figure 1:
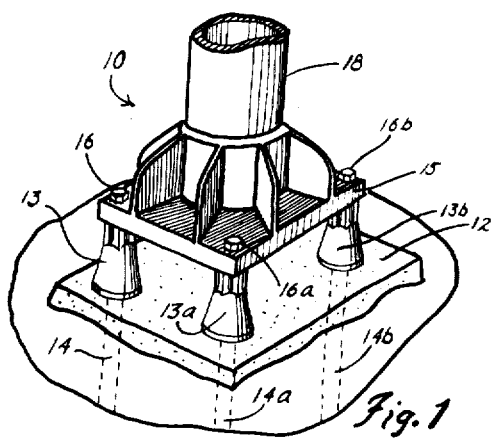
FIG. 1 is a schematic partially cutaway view of an assembly in accordance with the present invention.

In FIG. 1 there is a schematic isometric fractional view of an assembly in accordance with the invention generally designated by the reference numeral 10. The assembly 10 comprises in cooperative combination a base or fixed support member 12 having disposed therein four anchor means 14, 14a, 14b and one not shown, such as anchor bolts. Affixed to each of the anchor means or bolts are frangible or breakaway couplings 13, 13a and 13b and a fourth coupling (not shown). A support member or plate 15 is disposed adjacent the couplings 13, 13a and 13b and the fourth coupling (not shown) and remote from the base 12. The base 12 and plate 15 are maintained in fixed spaced relationship by the couplings 13, 13a, 13b and the fourth coupling (not shown). The plate 15 is affixed to the couplings 13, 13a, 13b and a fourth coupling (not shown) by means of connection members or bolts 16, 16a, 16b and one not shown. Each of the couplings, or coupling bodies, 13, 13a, 13b, is symmetrically disposed about any plane containing the generally vertical axis of connection A extending through connection members 16, 16a and 16b. An upright member or fixture support 18 is rigidly affixed to the plate 15. The fixture support 18 has affixed thereto the item desired to be supported, such as street or roadway lamps, signs, parking meters, warehouse roof supports, traffic signals, power or communication lines, pipe lines and the like. It is understood that such items may be supported by one or more of such supports, depending on the requirements of the particular item to be supported. The couplings 13, 13a, 13b and a fourth coupling (not shown) have relatively high tensile and compressive stength, but rupture readily when impact force is applied in a direction normal to the axis of the coupling; that is, in a horizontal plane.

Figure 2:
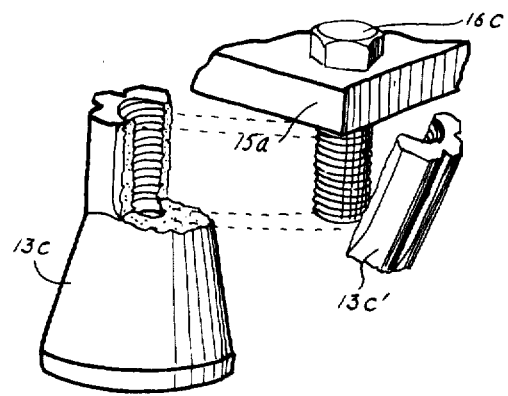
FIG. 2 is a schematic view of a coupling of the present invention after rupture by lateral impact.

In FIG. 2 there is schematically depicted failure by lateral impact of a coupling 13c such as the couplings 13, 13a and 13b of FIG. 1. The body 13c has broken away from the portion 13c thereby releasing the bolt 16c from the coupling 13c and permitting lateral movement of a plate or support 15a through which the bolt 16c passes.

Figure 3:
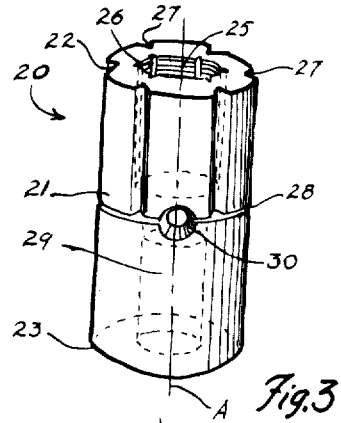
FIG. 3 is a schematic isometric representation of one embodiment of a coupling in accordance with the present invention.

In FIG. 3 there is schematically depicted an isometric view of a coupling in accordance with the present invention generally designated by the reference numeral 20 and suitable for use as coupling 13, 13a, 13b and the fourth coupling (not shown) of FIG. 1. The coupling 20 has an elongate body or portion 21 of a generally cylindical configuration having a first end 22, a second end 23 and an axis of coupling, or axis of connection, a generally coaxial with the body 21. The body 21 defines a generally axially extending connection receiving cavity 25 extending toward the second end 23. The body portion defining the cavity also defines internal bolt or threaded connected engaging threads 26. In the region of the connection receiving cavity 25, the body 21 defines a plurality of longitudinally extending regions of weakness, channels or grooves 27. A circumferential external grooves 28 defined by body 21 intersects the axially extending slots or grooves 27 generally adjacent the centralmost portion of the threads 26. A second internally threaded connection-receiving cavity 29 is defined in the body 21. The cavity 29 is generally coaxially disposed with the cavity 25. A radially extending circumferentially disposed wrench-receiving opening 30 is defined by the body 20. The opening 30 is disposed to permit installation by means of a hook spanner wrench.

The coupling 20 is FIG. 3 is readily employed in an assembly such as the assembly of FIG. 1 to replace the couplings 13, 13a, 13b and the fourth coupling (not shown). When the couplings, such as the couplings 20 are subjected to lateral impact, rupture of the couplings occurs generally at a location of the circular groove 28 which serves to prevent propagation of a crack or cracks to the end 23 of the coupling and oppositly disposed to the direction of impact permitting ready release of the connecting bolts such as the bolts 16, 16a, 16b and 16c. Under normal, i.e., non-impact conditions, the coupling provides ample tensile and compressive strength, but is relatively weak when subjected to impact in a plane normal to the axis A of the coupling 20.

Figure 4:
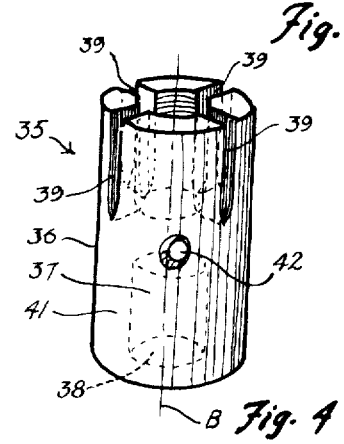
FIG. 4 is an isometric view of an alternate embodiment of the invention.

In FIG. 4 there is depicted a side view of an alternate embodiment of a coupling of the invention generally designated by the reference numeral 35. The coupling 35 has a body 36 of generally elongate cylindrical configuration generally similar to the body of FIG. 2. The body 36 defines an internal passageway 37 extending therethrough having an internal surface 38. The surface 38 defines a thread adapted to receive a fastener such as a mating threaded bolt. A plurality of slots or channels 39 interrupt the surface 38 and are generally equiangularly dispoed about the axis B of the body 36. The body 36 has an external surface 41 which is also interrupted by the slots 39, the slots 39 define longitudinally extending regions of weakness or minimum strength of the coupling 35. A spanner hole 42 is defined by the body 36 generally in a like manner to the opening 30 of FIG. 3.

The embodiment of FIG. 4 is particularly desirable when bolt release from the cavity 25 is desired with minimum lateral impact. The embodiment of FIG. 4 is employed in applications similar to that of FIG. 3 but provides an increased resistance to rupture when subjected to lateral impact.

Figure 5:
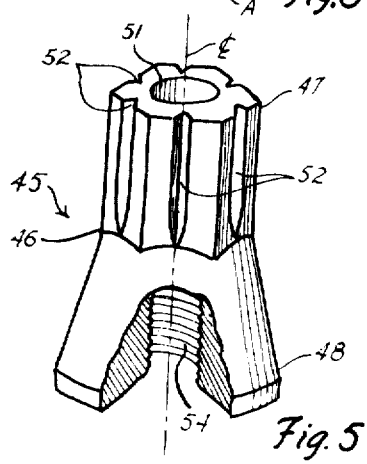
FIG. 5 is an isometric view of still another embodiment of the invention, as are FIGS. 6 and 8.

In FIG. 5 there is depicted an alternate embodiment of the invention generally designated by the reference numeral 45. The coupling 45 comprises a body portion 46 having a first end 47 and a second end 48. The body 46 has an axis of connection generally designated as C. At the first end 47 of the body 46 is defined an axially extending internal passageway 51 having an internally threaded surface and adapted to receive a threaded connection such as a bolt. A plurality of V-shaped grooves 52 are disposed in the outer surface of the body 46 adjacent the cavity 51 to provide longitudinally extending regions of weakness or minimum strength. A second axially extending threaded cavity 54 is disposed within the second end of the body 46 and is generally coaxially disposed with respect to the axis C and is also provided with an internally threaded surface. The second end 48 of the body 46 has a generally frustoconical configuration which tapers toward the first end 46.

The embodiment of FIG. 5 is particularly advantageous when the coupling is employed to connect a standard and a base wherein the base has substantially less physical strength than the material of the standard, such as when connecting a steel standard to a concrete base.

Figure 6:
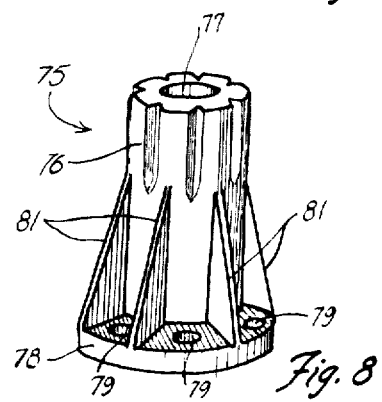

In FIG. 6 there is schematically illustrated an isometric view of an alternate coupling in accordance with the invention generally designated by the reference numeral 65. The coupling 65 comprises a bolt receiving portion 66 of generally cylindrical configuration. The portion 66 defines an internally threaded passageway 67 axially disposed within the body 66 and a plurality of grooves 68 disposed about the cavity 67 and extending axially and parallel thereto to a provide a plurality of longitudinally extending regions of weakness or regions of minimum strength. The portion 66 is rigidly affixed to a base or support end 71. The base portion 71 has a generally flat plate- like configuration and defines a plurality of peripherally disposed openings 72 passing entirely therethrough and adapted to receive anchor bolts or like fastening means.

The embodiment of FIG. 6 is particularly useful when a breakaway coupling supporting a metal standard must be affixed to a low strength body such as a wooden deck.

Figure 7:
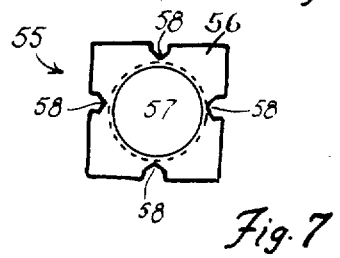
FIG. 7 is an end view of a further embodiment of the invention.

In FIG. 7 there is depicted an alternate embodiment of the invention generally designated by the reference numeral 55. The view was depicted in FIG. 7 is an end view. The coupling 55 has a body portion 56 having an internal passageway 57 extending entirely therethrough and having an internally threaded surface to engage suitable attaching means such as bolts, studs and the like. The body 56 is of a square configuration and in each of the external faces thereof has a groove 58 generally centrally disposed therein and extending toward the axis of the passageway 57. The grooves have generally straight parallel sides and terminate adjacent the passageway 57 in a sharp V inwardly pointing configuration.

The embodiment of FIG. 7 is particularly desirable when small quantities of couplings are to be made and can be readily fabricated from square bar stock with a minimum of machine operation.

Figure 8:
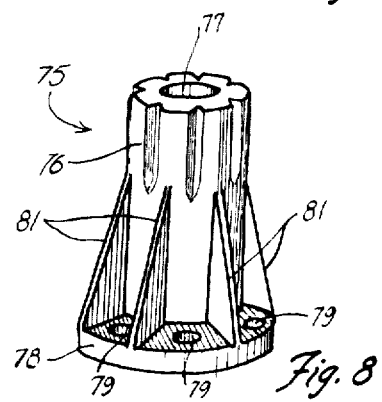

In FIG. 8 there is depicted an alternate embodiment of the invention designated by the reference numeral 75. The coupling 75 has a body 76 having the general configuration of the body 21 of FIG. 3 and a connector-receiving cavity 77 having an unthreaded internal surface. The body 76 remote from the cavity 77 is affixed to a base plate 78 having a plurality of mounting aperatures 79 defined therein. The body 76 is further affixed to the base 78 by means of a plurality of fillet plates or braces 81 of triangular configuration radially spaced about the body 76. The coupling of FIG. 8 is particularly desirable for small signs requiring a single standard which are affixed to a low strength deck and are attached to the coupling 75 by a pin, bolt, set screw or adhesive entering the cavity 77 to engage a standard or support, not shown.

Figure 9:
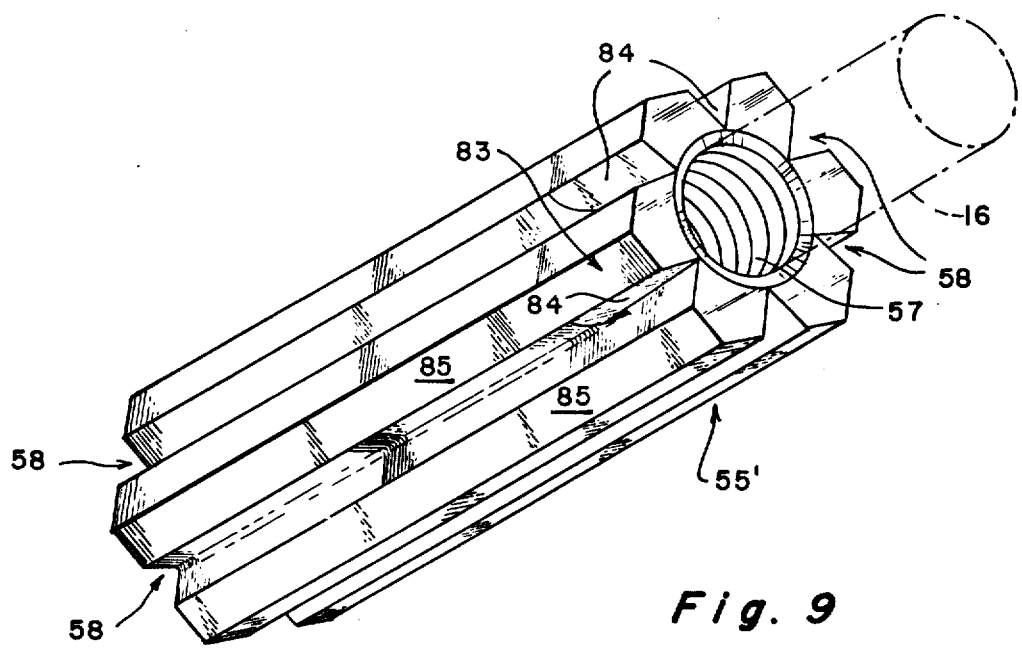
FIG. 9 is a perspective view of an embodiment of a coupling body according to the present invention like that in FIG. 7.
Figure 10:
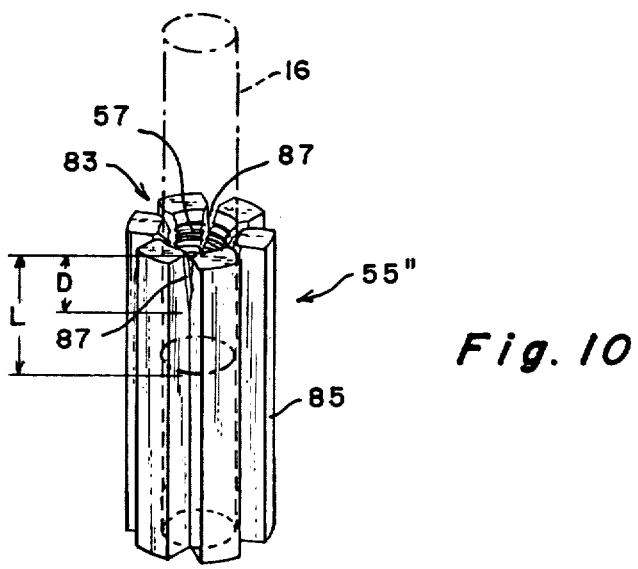
FIG. 10 is a perspective view of another modification of the coupling body of FIG. 9.

A minor modification of coupling 55 of FIG. 7 is shown at 55' in FIG. 9. The coupling 55' is substantially the same as the coupling 55 in FIG. 7, having a plurality of grooves 58 extending along the length thereof, except that six grooves 58 are provided instead of just four, and radial fracture initiating means, shown generally at 83, are provided in order to reduce the impact forces necessary to radially fracture the coupling 55' to release a connection member 16 therefrom. The fracture initiating means 83 may comprise sharpened bottom portions 84 of portions 85 of coupling 55' which define the grooves 58, the grooves 58 thus having a slightly greater cross-sectional area at the end of the coupling 55' having the connection member receiving opening 57 therein, than the cross-sectional area further down the coupling 55'. The tapered portions 84 decrease the impact force necessary to radially fracture the coupling 55', while not significantly detracting from the tension and compression forces that may be applied to the coupling 55' without fear of failure thereof during normal use. In FIG. 10, another modification of the radial fracture initiating means 83 is provided for the coupling 55', in the form of slots 87 formed in the grooves and extending from the end of the coupling body 55' having the connection member receiving opening 57 therein, parallel to the axis of connection A, the slots 87 extending a distance D less than the length L of the connection member 16 received by the opening 57. The portions 85 which define the grooves 58 in the FIG. 10 embodiment have rounded circumferential portions thereof instead of the pointed circumferential portions shown in FIGS. 7 and 9.

Figure 11:
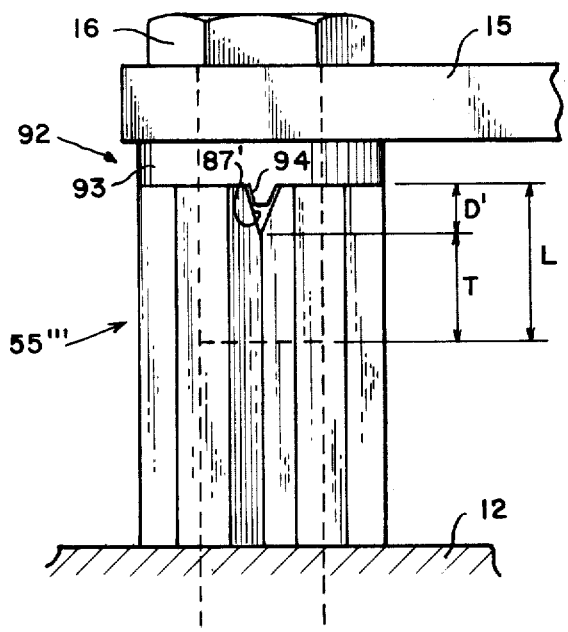
FIG. 11 is a side view of an embodiment according to the present invention utilizing a toothed washer to facilitate the initiation of fracture in the coupling.
Figure 13:
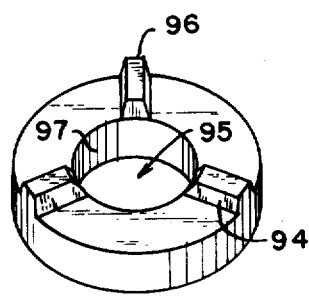
FIG. 13 is a perspective, upside-down view of the exemplary fracture-initiating washer of FIG. 11.
Figure 12:
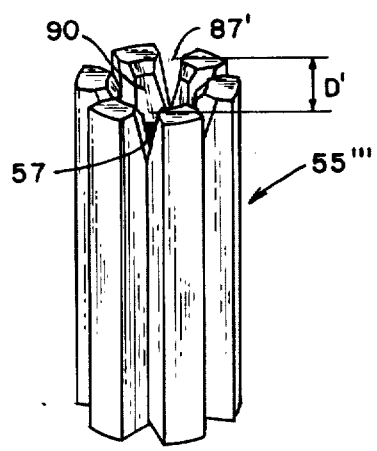
FIG. 12 is a perspective view of the coupling of FIG. 11.

FIG. 11 shows an assembly according to the present invention having further component parts associated therewith for initiating the fracture in the coupling 55'''. The coupling 55''' is substantially the same as the coupling 55'' of FIG. 10 except that the slots 87' formed therein preferably are slightly wider than the slots 87 in coupling 55'', and preferably the portion 90 thereof, extending the distance D' between the top of the coupling 55''' and the bottom of the slots 87', is not threaded, rather only the portion T extending from the bottom of the slots 87' downwardly, being threaded, the distances D' and T = the length L of the connection member 16 received by the opening 57 in the coupling 55'''. Disposed between the plate 15 of a generally vertical standard and the coupling 55''' is a fracture-initiating washer 93 having one or more teeth 94 formed thereon for cooperating with the slots 87' formed in the coupling 55''', and having a bore 95 (see FIG. 13) formed therethrough for allowing passage of the connection member 16 therethrough. Each of the teeth 94 preferably have terminal portions 96 thereof that are flat, and preferably the bore 95 therethrough has smooth walls 97 so that no positive, holding engagement between the connection member 16 and the washer 93 is provided. The washer 93 is preferably made of harder material than is the coupling 55'''; for instance, when the coupling 55''' is made of aluminum (as is usual) the washer 93 may be made of steel. While only three teeth have been shown for the washer 93 in FIG. 13, it is to be understood that any number of teeth 94 may be provided, such as one tooth 94 for each slot 87' of the coupling (the coupling also may have as many grooves or slots as desired), one tooth 94 for every other slot 87', etc. Teeth 94 localize the entire impact load, resulting in more efficient splitting of the coupling body.

Couplings in accordance with the present invention can be prepared from a wide variety of materials. The property that is most important is that the material be subject to fracture under conditions of use. A wide variety of metals can be employed, including aluminum, either cast or machined, steel, brass, bronze, stainless steels, zinc alloys and the like. Various plastic materials are also useful including phenolformaldehyde resinous compositions, polystyrene, nylon and the like. Ceramic materials are also suitable. The coupling bodies can be either cast or extruded. For instance, the coupling 45 in FIG. 5 preferably could be cast from aluminum, while the coupling 55 shown in FIGS. 7, 9 and 10 may readily be extruded from aluminum.

Generally in the preparation of couplings in accordance with the present invention it is desirable to use from 2 to 20 longitudinally extending regions of weakness. Such longitudinally extending regions of weakness most beneficially are grooves formed in the outer wall of the coupling and surrounding the connector-receiving cavity. For most applications, the depth of the groove ranges from about 10 to about 90 percent of the thickness of the wall (discounting any threads which may be present), and beneficially from about 15 to 50 percent of the wall thickness. Beneficially such grooves should terminate in a relatively sharp V configuration, preferably having a radius not greater than about 0.002 inch. However, in some instances a radius of up to 0.2 inch may be tolerated. A minimum of two grooves or regions of weakness should be present, and generally not more than 20 of such grooves are employed. Beneficially for most applications, between three and six grooves are adequate. Generally for most purposes the grooves are symmetrically disposed about the longitudinal axis of the coupling, permitting the coupling to be installed with disregard to orientation about the axis. However, in certain instances the appropriate longitudinal regions of weakness may be applied only on a side which is remote from the direction of impact. Couplings in accordance with the present invention generally fail because of tensile rupture initiated at the bottom of the longitudinally extending grooves and do not in general rely upon shear failure. Thus, the couplings in accordance with the present invention provide a relatively high tensile and compressive strength relative to the impact force required to cause failure applied in the direction normal to the axis of coupling. Employing couplings in accordance with the present invention, the impact required for failure in any given design is quite uniform from specimen to specimen.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An upright standard assembly comprising the combination of
   a. a generally vertical standard,
   b. a base member,
   c. a connection member,
   d. means affixed to one of said base member or said standard for receiving said connection member to releasably attach said standard to said base member, and having a generally vertical axis of connection extending through said connection member, said means comprising
      i. coupling means for receiving said connection member and for fracturing radially with respect to said axis of connection in response to an impact force applied to said standard in a generally horizontal direction generally normal to said axis of connection, said coupling means comprising a coupling body generally symmetrically disposed about any plane containing said axis of connection, said body having a first end in operative association with said base member, and a second end in operative association with said upright standard, at least one of said first and second end defining a connection member receiving opening therein, said connection member extending into said body a predetermined length along said axis of connection, said body having a plurality of grooves which define regions of minimum strength, said grooves surrounding said connection member receiving opening of said coupling body and extending from said connection member receiving end of said body parallel to said axis of connection and extending at least the length of said predetermined length of said connection member received by said body, and extending so that upon an impact force in a generally horizontal direction acting upon said standard, said coupling means will radially fracture to thereby release said connection member and thereby provide detachment of said standard from said base member, and
   e. means for initiating the radial fracture of said coupling body member, said means comprising (i) at least one fracture-initiating slot formed in at least one of said grooves and extending from the end of said coupling body defining said connection means receiving opening parallel to said axis of connection, said at least one slot extending a distance less than said predetermined length of said connection member received by said coupling body, and (ii) a radial fracture-initiating washer having at least one radially extending tooth formed thereon for receipt by said at least one fracture-initiating slot, said washer disposed between one of said generally vertical standard and said base member, and said coupling body, and said connection member extending through said washer.

2. An assembly as recited in claim 1 wherein said grooves in said coupling body extend the entire length of said body.

3. An assembly as recited in claim 1 wherein said washer is made of a material harder than the material of which said coupling body is made.

4. An assembly as recited in claim 3 wherein said washer is made of steel and said coupling body is made of aluminum.

5. An assembly as recited in claim 1 wherein said connection member is a threaded rod, and wherein said coupling body connection member receiving opening is threaded for receipt of said threaded rod connection member therein, and wherein no threads are provided in the portion of said connection member receiving opening of said coupling body from the end thereof to the termination of said at least one fracture-initiating slot.

6. An assembly as recited in claim 1 wherein said washer has a bore therein for receipt of said connection member therethrough, and wherein said bore has relatively smooth surfaces, no threading being provided therein.

7. An assembly as recited in claim 1 wherein a slot is provided in said coupling member associated with each groove therein.

8. An assembly as recited in claim 7 wherein said washer has one tooth corresponding to each of the slots formed in the coupling body with which it cooperates.

9. An assembly as recited in claim 7 wherein said washer has one tooth for every other slot formed in the coupling body with which it cooperates.

10. An assembly as recited in claim 1 wherein both said first and second ends of said coupling body have connection receiving openins therein, and wherein one connection member extends from said base member to said coupling body, and another connection member extends from said standard through said washer to said coupling body.

* * * * *